A. B. WROTH.
Wagon-Reach.
No. 168,313. Patented Sept. 28, 1875.
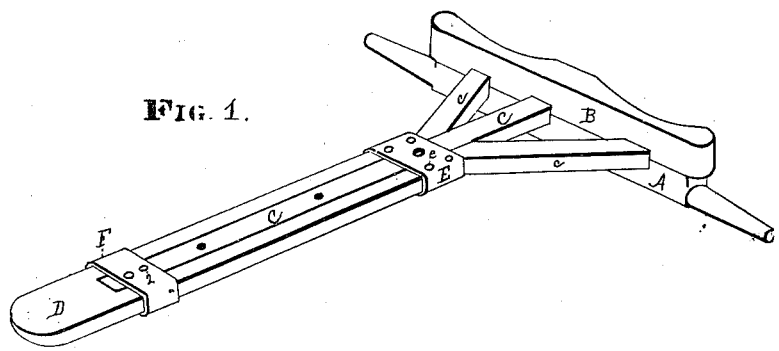
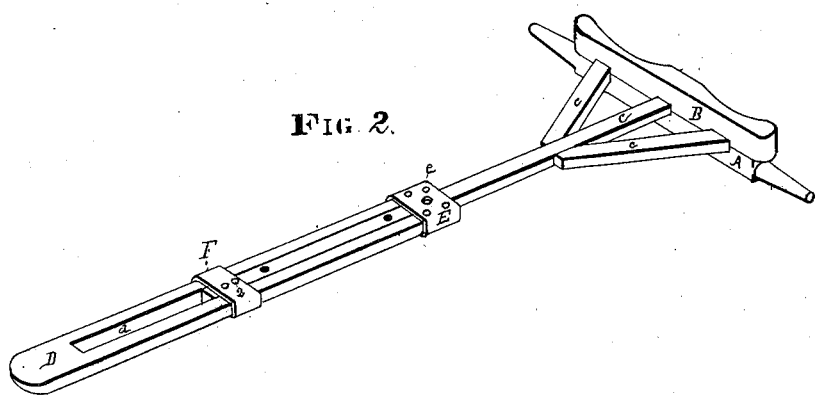
WITNESSES
F. B. Townsend.
Will. H. Moson
INVENTOR
Alfred B. Wroth
Per Attys
A. H. Evans & Co

UNITED STATES PATENT OFFICE.

ALFRED B. WROTH, OF WINTERSET, IOWA, ASSIGNOR OF TWO-THIRDS HIS RIGHT TO SAMUEL D. KIRKLAND AND CHARLOTTE GORDON, OF SAME PLACE.

IMPROVEMENT IN WAGON-REACHES.

Specification forming part of Letters Patent No. 168,313, dated September 28, 1875; application filed July 3, 1875.

*To all whom it may concern:*

Be it known that I, ALFRED B. WROTH, of Winterset, Iowa, have invented certain new and useful Improvements in Wagon-Reaches; and I do hereby declare the following to be a full, clear, and exact description thereof, reference being had to the accompanying drawing, making part of this specification, in which—

Figure 1 is a perspective view of my invention. Fig. 2 is the same view with the reach partially extended.

In order to enable those skilled in the art to make and use my invention, I will proceed to describe the exact manner in which I have carried it out.

My invention relates to that class of reaches known as extension-reaches; and it consists in so constructing the reach as to have the extension all between the fore and hind wheels, and avoiding its projecting out behind the rear end, being made stationary between the axle and hind bolster.

In the said drawings, A represents the hind axle, and B the hind bolster, of a wagon. Between them is rigidly secured the hind end of the reach C, braced in position by the hounds *c c*. The forward part of the reach D is constructed with a slot, *d*, into which snugly fits and slides the forward end of the reach C. Around the rear end of the portion D I secure a wrought-iron band, of any suitable material, E, by means of the bolts *e e*. A similar band, F, embracing the portion D, is secured to the forward end of the reach C by the bolts 2. By this construction the portions C and D, sliding within these bands, admit of an extension of the reach, while the bands themselves add to it great strength and security.

It is apparent that a reach thus constructed can be readily applied to a wagon without any change in the hounds, which renders the reach comparatively cheap in its application to wagons already in use.

The band E has a central perforation through it to admit the bolt-pin, which passes through the reach C at desired points, for the purpose of securing the reach in position when adjusted as desired.

It is evident from this description that my improved reach can be adjusted with but little trouble, and, when coupled up, is neat and strong, while sufficient strength is secured to it when coupled out its greatest length. It entirely avoids the use of extra reaches, and secures a much greater strength than when the reach works loosely between the hind axle and bolster.

Having thus described my invention, what I claim as new, and desire to secure by Letters Patent, is—

The reach C, rigidly attached between the axle and the hind bolster of a wagon, and secured between the ordinary hounds, and provided on its fore end with the band F, in combination with the slotted reach D, provided on its rear end with the band E, all substantially as and for the purpose set forth.

ALFRED B. WROTH.

Witnesses:
J. F. SMITH,
M. COON.